United States Patent [19]
Gongwer

[11] Patent Number: 6,119,586
[45] Date of Patent: Sep. 19, 2000

[54] AUTOMATIC BARBEQUE ASSEMBLY WITH BYPASS LEVER

[75] Inventor: Troy W. Gongwer, Wakarusa, Ind.

[73] Assignee: Nelgo Manufacturing, Inc., Wakarusa, Ind.

[21] Appl. No.: 09/387,589

[22] Filed: Aug. 31, 1999

[51] Int. Cl.⁷ ..................................................... A47J 37/04
[52] U.S. Cl. ............................... 99/345; 99/386; 99/393; 99/402; 99/427; 99/443 C; 99/448
[58] Field of Search .............................. 99/345, 386, 391, 99/393, 402, 427, 443 C, 448; 219/388, 402

[56] References Cited

U.S. PATENT DOCUMENTS

| | | | |
|---|---|---|---|
| 4,103,606 | 8/1978 | Gitcho | 99/345 X |
| 4,453,457 | 6/1984 | Gongwer et al. | 99/345 |
| 5,542,345 | 8/1996 | Gongwer | 99/345 |

*Primary Examiner*—Reginald L. Alexander
*Attorney, Agent, or Firm*—Baker & Daniels

[57] ABSTRACT

An automatic barbeque assembly is provided having a cooking oven, a conveyor mechanism mounted in the oven, a sauce tank mounted in the oven for holding sauce, a food carrying mechanism connected to the conveyor mechanism for carrying food products in the oven and into the sauce, and a bypass mechanism for preventing the food carrying mechanism from dipping into the sauce wherein the bypass mechanism can be activated from the exterior of the cooking oven using only one hand. The bypass mechanism includes a by-pass lever and a bypass lever rod wherein the bypass lever is permanently affixed at points along the length of the bypass lever rod. The bypass lever rod is rotatably mounted within the oven. The bypass lever and bypass lever rod together form a trapezoidal shape. The bypass lever rod extends through an aperture in the oven and rotates within the aperture. An activation rod is mounted to an end of the bypass lever rod on the exterior of the oven. The activation rod has a handle for activating the bypass mechanism. A latch is provided on the automatic barbeque assembly for holding the bypass mechanism in place.

22 Claims, 4 Drawing Sheets

AUTOMATIC BARBEQUE ASSEMBLY WITH BYPASS LEVER

FIELD OF THE INVENTION

The present invention relates to an automatic barbeque assembly and, more particularly, to an automatic barbeque assembly with a sauce tank for holding sauce, a mechanism for dipping food products into the sauce, and a bypass lever that can be used to prevent the food products from being dipped into the sauce.

BACKGROUND OF THE INVENTION

Numerable methods and machines have been devised for cooking meat, poultry, and fish food products. These methods and machines use a host of cooking technologies including frying, baking, steam and broiling. Broiled meat products have become increasingly popular. This method provides a way to cook with reduced fat content and provide flavorful foods.

An automatic food cooking machine for broiling or barbequing flavorful foods is disclosed by U.S. Pat. No. 4,453,457 to Nelson Gongwer et al., incorporated herein by reference. The food cooking machine disclosed in the above mentioned patent is an energy efficient unit of a durable nature that can cook a high volume of food with exquisite flavor. The food cooking machine contains an oven with heating elements and a conveyor system for circulating the food products through the oven and past the heating elements. The food cooking machine also includes a sauce tank whereby as foods are circulated through the oven and past heating elements, the food products are also dipped into the sauce tank to enhance the flavor and texture of the cooked foods. The patent to Gongwer et al. also discloses a moveable runner that may be shifted in position over the sauce tank to prevent the food products from being dipped into the sauce while the cooked food products are being loaded into or removed from the oven.

While the moveable runner disclosed in the patent to Gongwer et al. does preclude the food products from being dipped into the sauce, the runner has limitations in that it must be positioned into place using two hands. It would be desirable to have a mechanism for preventing food products from being dipped into the sauce that can be operated using only one hand thereby allowing the operator's other hand to be free to perform other tasks.

Furthermore, the prior art rods that are used to pull the runner into position were located within the oven cavity. As such, the door of the oven had to be opened in order to pull the runners into place. As these rods were located in the oven, pulling the rods into place creates a potential burn hazard for the operator, and a generally uncomfortable work task for the operator due to the elevated temperature.

Lastly, the runners in the prior art extend behind the sauce tank occupying addition room in the cavity of the oven. If a mechanism for bypassing the sauce tank could be stored in the sauce tank itself, this would save space in the interior of the oven.

An object of the invention therefore is to provide a food cooking machine or automatic barbeque assembly with a sauce tank and an improved mechanism to allow the food products to bypass the sauce tank. In particular, a sauce tank bypass mechanism is needed which can be operated with one hand from the exterior of the oven and which minimizes the storage space required for the bypass mechanism within the oven cavity.

SUMMARY OF THE INVENTION

The invention has been accomplished by providing an automatic barbeque assembly having a cooking oven, a conveyor mechanism mounted in the oven, a sauce tank mounted in the oven for holding sauce, a food carrying mechanism connected to the conveyor mechanism for carrying food products within the oven and into the sauce, and a bypass mechanism for preventing the food carrying mechanism from dipping the food products into the sauce wherein the bypass mechanism can be activated from the exterior of the cooking oven using only one hand.

It is a further feature of the invention to have the bypass mechanism include a by-pass lever and a bypass lever rod whereby the bypass lever is permanently affixed to the bypass lever rod. The bypass lever rod is rotatably mounted within the oven. The bypass lever and bypass lever rod together form a trapezoidal shape.

An additional feature of the invention is to have the bypass lever rod extend through an aperture in the oven and to rotate within the aperture. An activation rod is mounted to the bypass lever rod on an end of the bypass lever rod that is located on the exterior of the oven. The activation rod has a handle for activating the bypass mechanism.

Lastly is a feature of the invention to include a latch on the automatic barbeque mechanism assembly for holding the bypass mechanism in place.

DETAILED DESCRIPTION OF THE PREFERRED EMBODIMENT

Figure 1:
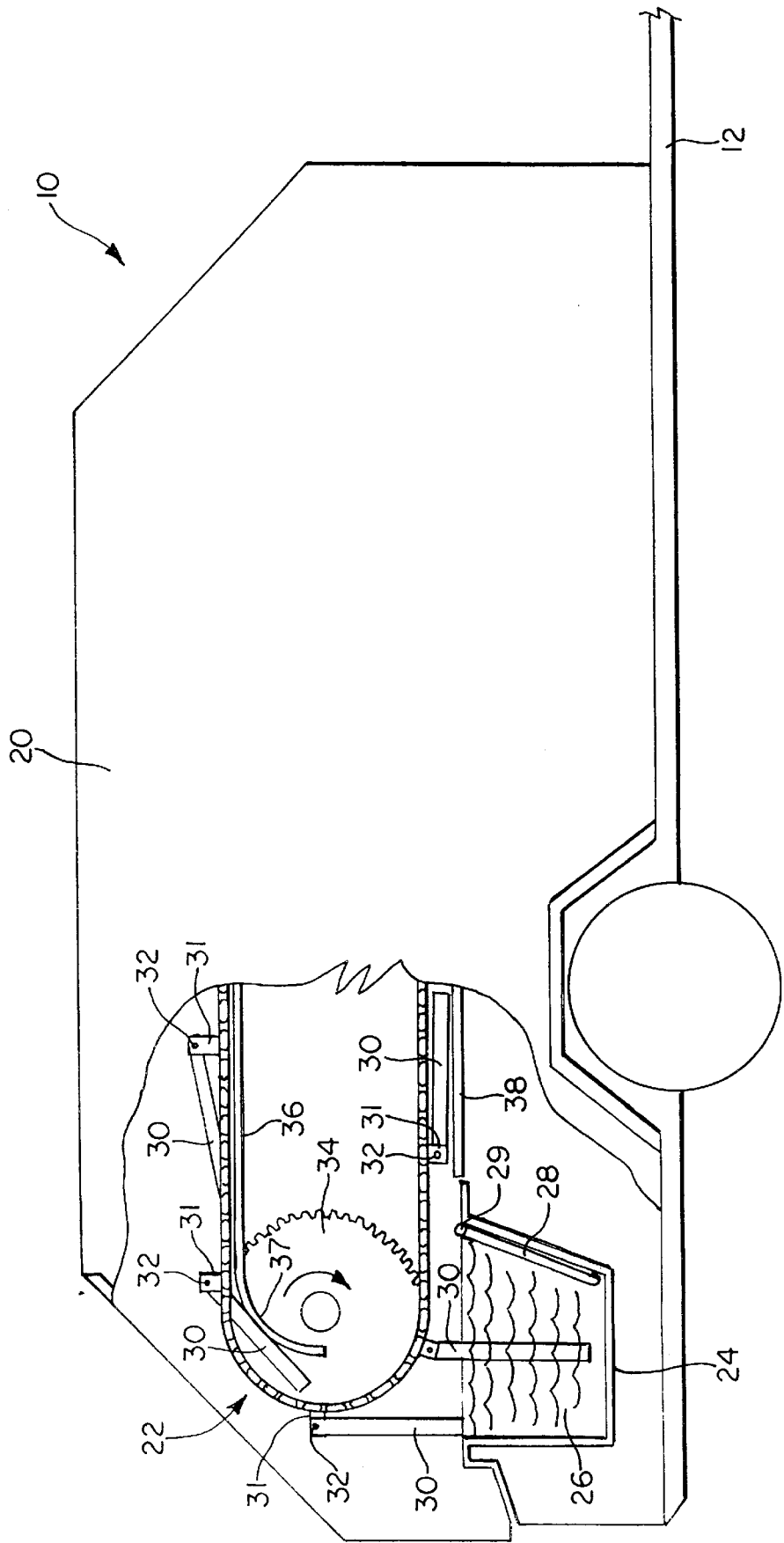
FIG. 1 is a side view of the food cooking machine with a partial section removed depicting the bypass mechanism in an inactivated position so that food products being conveyed within the oven will dip into the sauce.
Figure 2:
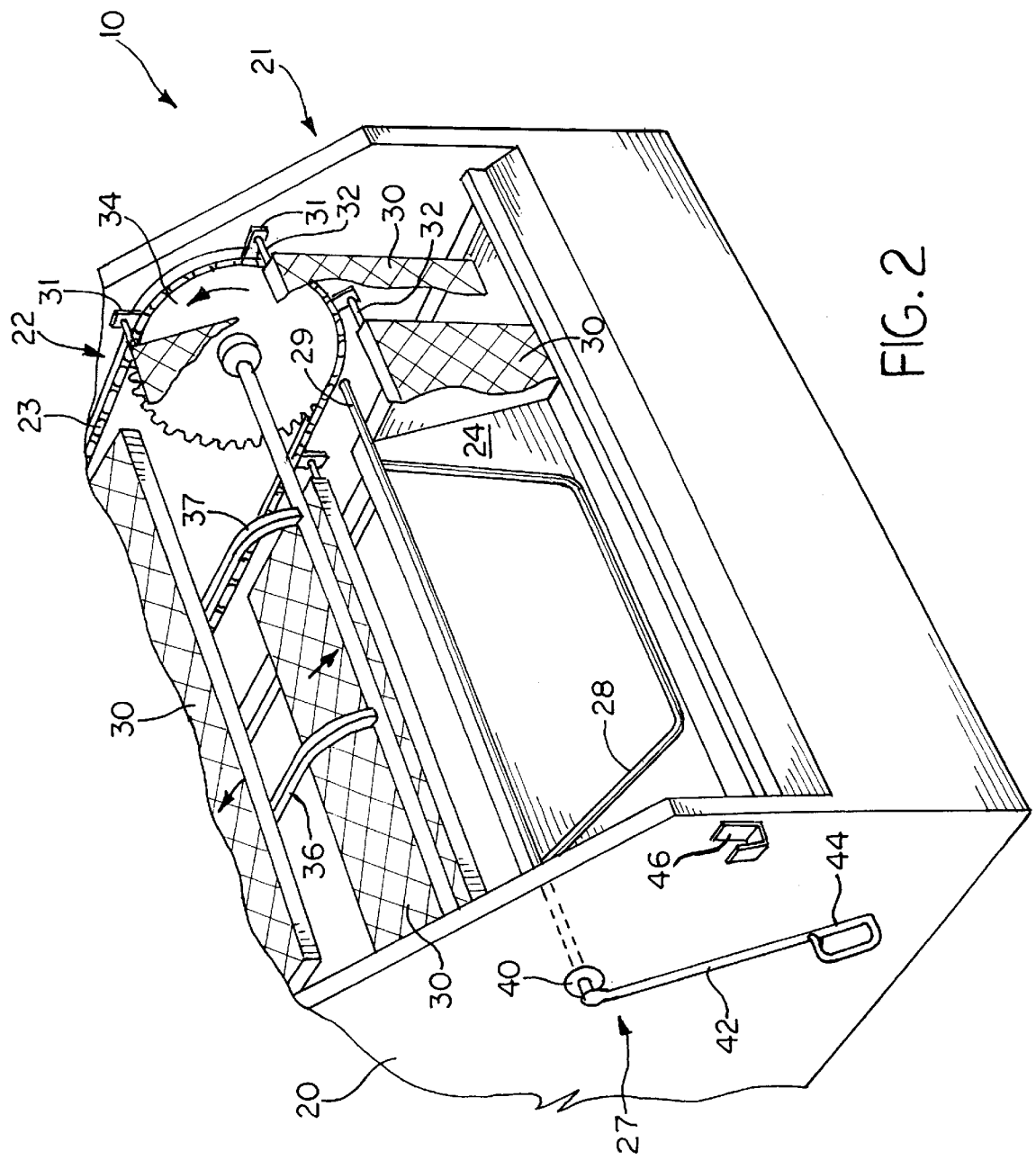
FIG. 2 is a partial isometric view of the food cooking machine through the openings showing the bypass mechanism in the inactivated position.

FIGS. 1 and 2 illustrate the preferred embodiment of an automatic barbeque assembly 10. Assembly 10 includes a cooking oven 20, a conveyor mechanism 22, a bypass mechanism 27, and a supporting frame 12.

Oven 20 may be of any suitable size, shape and material; however, in the preferred embodiment the oven is shaped substantially as a rectangular box. The oven may be made out of stainless steel and have insulated sidewalls to hold in heat. Oven 20 has an opening 21 located at an end of oven 20 for loading and unloading food products (not shown). Within oven 20 is a sauce tank 24 as will be described in greater detail herein, which is used to hold the sauce 26.

Conveyor mechanism 22 includes a driving chain 23 and sprocket 34, which carry food carrying mechanisms 30 within oven 20, where the food mechanisms 30 are attached to conveyor mechanism 22 by rods 32 and lugs 31. Food carrying mechanisms 30 are guided through the oven on an upper rail 36 and a lower rail 38. Upper rail 36 has a curved end 37 to facilitate the smooth transition of food carrying mechanisms 30 from a vertical hanging position when going around sprocket 34 to a horizontal position on upper rail 36.

With respect now to FIG. 2, the bypass mechanism 27 is shown including a bypass lever 28, a bypass lever rod 29, and an activation rod 42 located on the exterior of oven 20. Bypass lever 28 consists of a bent rod permanently affixed to bypass lever rod 29 by welding or other suitable means, whereby the bypass lever 28 forms a trapezoidal shape in conjunction with bypass lever rod 29. Bypass lever rod 29 is rotatably mounted within oven 20, wherein one end of bypass lever rod 29 is extended through an aperture 40 in a sidewall of oven 20, rotating therein. The other end of bypass lever rod 29 is rotatably mounted to an interior sidewall of oven 20. Activation rod 42 is affixed by welding threaded attachment or other suitable means to the end of bypass lever rod 29 that extends outside of oven 20. A handle 44 is formed on the end of activation rod 42. A latch 46 is fixed to the outside of oven 20 for purposes of locking bypass mechanism 27 into a fixed position.

Conveyor mechanism 22 is powered by a motor (not shown) preferably located on the exterior of the oven 20. The motor drives sprocket 34 in the direction of the arrow shown thereon creating a translation of chain 23. Chain 23 integrates with another freely rotating sprocket (not shown) to the rear of the oven for supporting and maintaining proper tension on chain 23. Food carrying mechanisms 30 consist of stainless wire mesh baskets or other suitable means for holding the food products as they are carried through the oven 20 and cooked. Food carrying mechanisms 30 are secured to and rotated with chain 23 by carrier rods 32 and lugs 31.

With the device as described above, the operation will now be described in detail. As food carrying mechanisms 30 are attached to the chain 23, when the motor drives conveyor mechanism 22. The food carrying mechanisms 30 are carried throughout oven 20 guided by the upper rail 36 and lower rail 38. As shown in FIG. 1, as food mechanisms 30 are carried near sprocket 34 mechanisms 30 dip into sauce tank 24 thereby coating the food products (not shown) in mechanism 30 with sauce 26 to provide flavor and texture to the food products. Bypass mechanism 27 is provided as a means to prevent food mechanisms 30 from dipping into sauce 26 as is desirable when loading and unloading the food products in oven 20. In FIGS. 1 and 2, bypass mechanism 27 is shown in the inactivated position thereby allowing food products to be dipped into sauce 26. In this position, bypass lever 28 is located within sauce tank 24 and sauce 26.

Figure 1A:
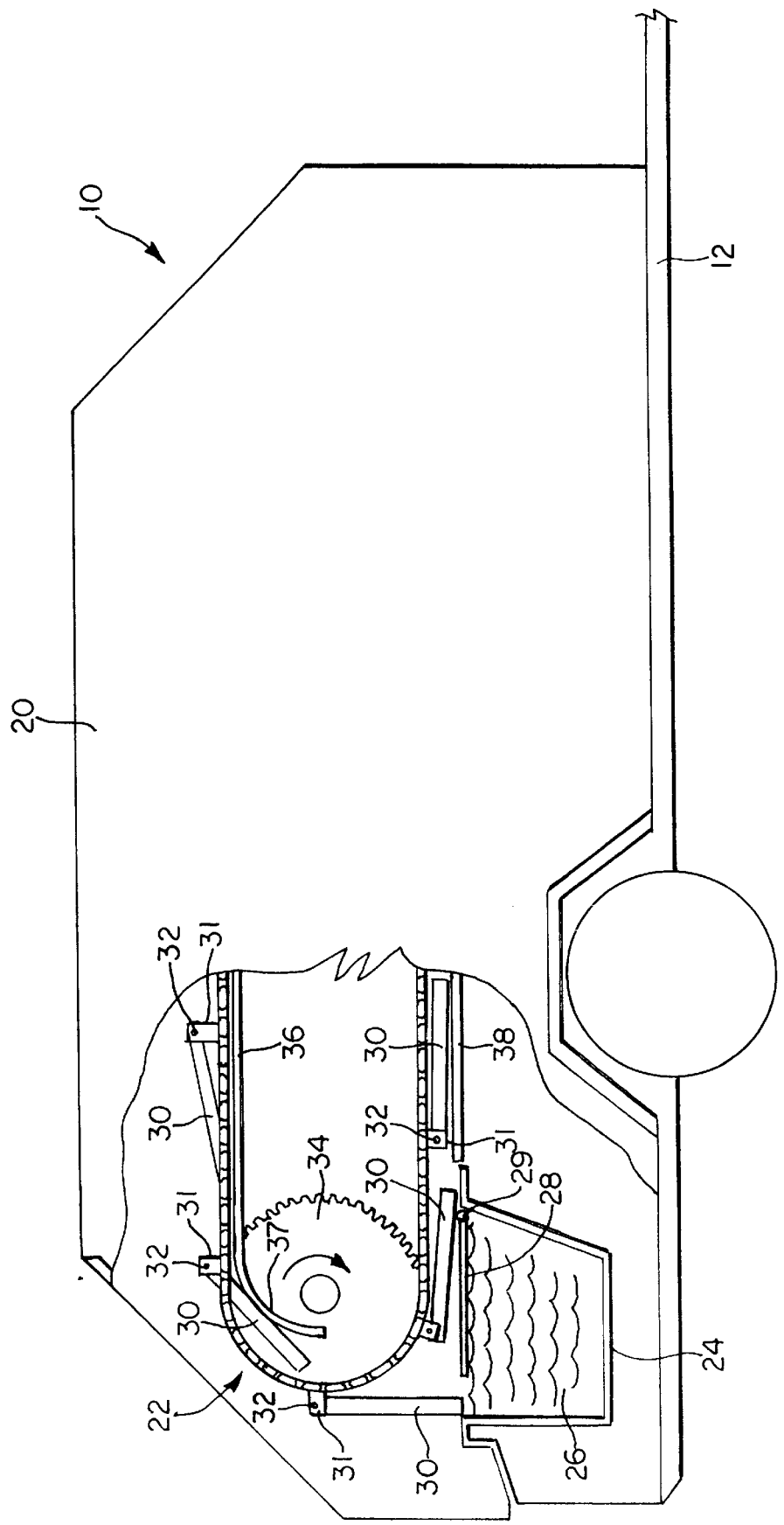
FIG. 1a is a side view of the food cooking machine with a partial section removed depicting the bypass mechanism in an activated position to prevent food products from being dipped into the sauce.
Figure 2A:
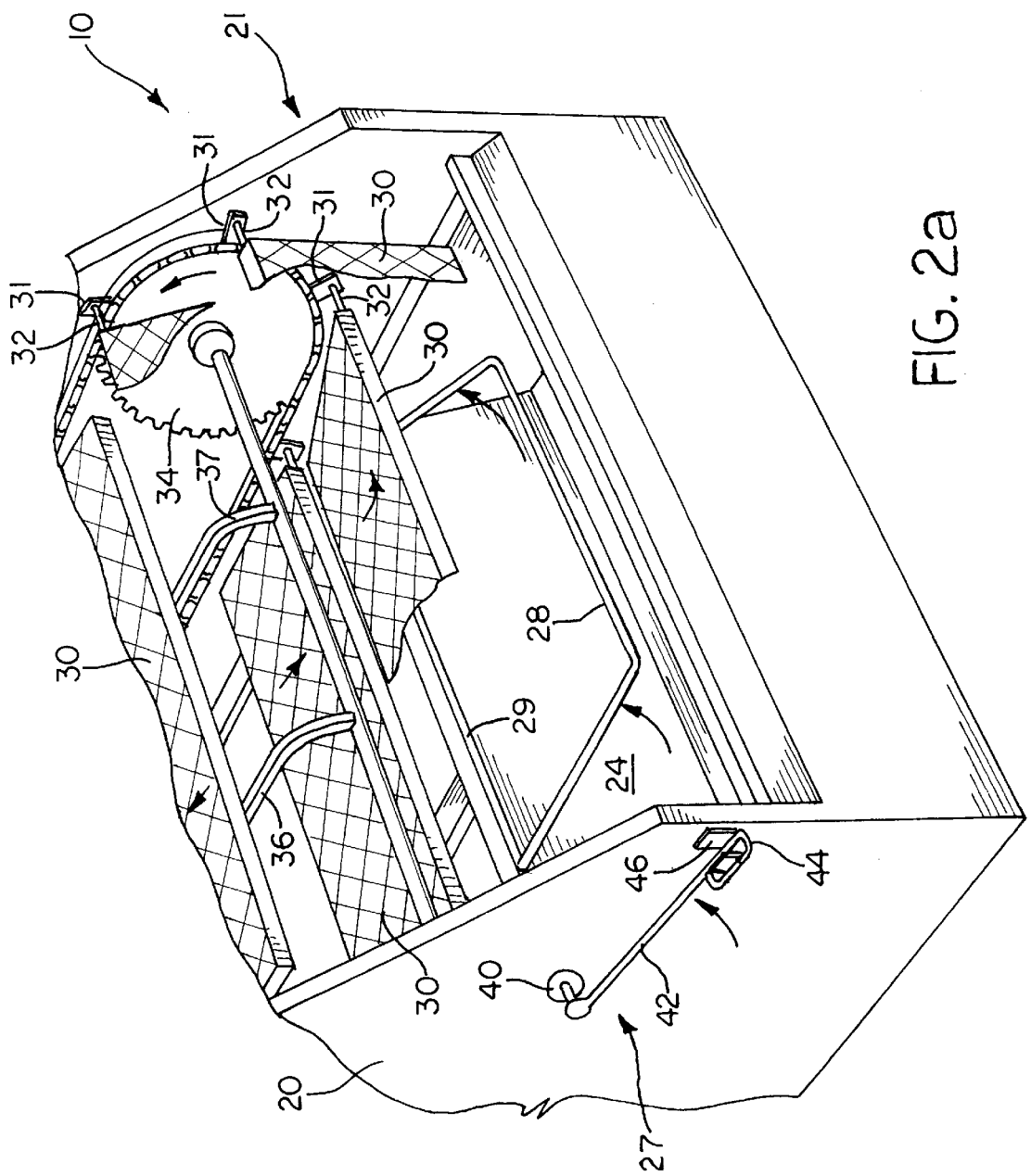
FIG. 2a is a partial isometric view of the food cooking machine through the opening showing the bypass mechanism in the activated position to prevent food products from being dipped into the sauce.

In FIGS. 1a and 2a, the bypass mechanism is shown in the activated position, that is rotated to prevent food carrying mechanisms 30 from dipping into sauce 26. Bypass mechanism 27 is activated by an operator pulling handle 44 and moving the activation rod in a direction shown by the arrows in FIG. 2a. When activation rod 42 is pulled up, bypass lever rod 29 rotates in aperture 40 until bypass lever 28 is rotated out of the sauce and into a horizontal position overlying the tank. Bypass mechanism 27 may be locked into an activated position by placing handle 44 in latch 46. While bypass mechanism 27 is in the activated position, food carrying mechanisms 30 rest on and glide upon bypass lever 28 thereby preventing the food products from dipping into sauce tank 24.

Frame 12 may be integral with or attached to a trailer so that the automatic barbequing, mechanism 10 may be transported to a desired location. It is to be appreciated that numerous variations from the example of the preferred embodiment described herein may be made without departing from the scope of the invention. For example, the shape of bypass lever 28 may be varied to any shape as long as it prevents food carrying mechanisms 30 from dipping into sauce 26. Furthermore, bypass lever 28 may be manufactured from a plate instead of a bar.

Additionally, as shown in FIG. 2, latch 46 is made from a strip of metal bent in a U-shaped configuration; however, any latching mechanism may be used that will hold the bypass mechanism in the activated position. In the preferred embodiment, a latching mechanism is not required to hold the bypass mechanism in the inactivated position as the bypass lever 28 rests against the back of sauce tank 24.

Those skilled in the art will appreciate that the conception, upon which this disclosure is based, may readily be used as a basis for the designing of other structures, methods and systems for carrying out the several purposes of the present invention. Further, the abstract is neither intended to define the invention of the application, which is measured by the claims, neither is it intended to limit the scope of the invention in any way.

What is claimed is:

1. An automatic barbecue assembly, comprising a cooking oven, a conveyor mechanism mounted in the oven, a sauce tank mounted in the oven for holding sauce, a food carrying mechanism connected to the conveyor mechanism for carrying food products within the oven and into the sauce tank so as to dip the food products in the sauce, and a bypass mechanism having a bypass lever pivotally mounted within the oven so as to prevent the food carrying mechanism from dipping into the sauce tank when the lever is pivoted to a horizontal position.

2. The automatic barbeque assembly of claim 1 wherein the bypass lever is located within the sauce tank when the lever is in an inactivated position that allows food products to be dipped into the sauce.

3. The automatic barbeque assembly of claim 1, further comprising a bypass lever rod serving as the pivotable mount for the bypass mechanism.

4. The automatic barbeque assembly of claim 3, wherein the bypass lever comprises a bent bar permanently affixed to the bypass lever rod.

5. The automatic barbeque assembly of claim 4, wherein the bypass lever and bypass rod form a trapezoidal shape.

6. The automatic barbeque assembly of claim 3, wherein an end of the bypass lever rod protrudes through an aperture in the oven and rotates therein.

7. The automatic barbeque assembly of claim 6, further comprising an activation rod mounted to the end of the bypass lever rod for pivoting the bypass lever.

8. The automatic barbeque assembly of claim 7, wherein the activation rod includes a handle for easily gripping the bypass activation rod and pivoting the bypass lever.

9. The automatic barbeque assembly of claim 1, further comprising a latch to lock the bypass lever in position.

10. An automatic barbecue mechanism assembly, comprising a cooking oven, a conveyor mechanism mounted in the oven, a sauce tank mounted in the oven for holding sauce, a food carrying mechanism connected to the conveyor mechanism for carrying food products to be cooked within the oven and into the sauce tank so as to dip the food products into the sauce, and a bypass mechanism rotatably mounted within the oven for preventing the food carrying mechanism from dipping into the sauce tank when the bypass mechanism is rotated into position.

11. The automatic barbeque mechanism assembly of claim 10, wherein the bypass mechanism comprises a bypass lever permanently affixed to a bypass lever rod.

12. The automatic barbeque mechanism assembly of claim 11, wherein a portion of the bypass lever rod extends through an aperture in the oven and rotates therein.

13. The automatic barbeque mechanism assembly of claim 11, wherein the bypass lever and the bypass lever rod form a trapezoidal shape.

14. The automatic barbeque mechanism assembly of claim 11, wherein the bypass mechanism further comprises an activation rod mounted to an end of the bypass lever rod on the exterior of the oven.

15. The automatic barbeque mechanism assembly of claim 14, wherein the activation rod includes a handle for grasping and pivoting the bypass lever mechanism.

16. The automatic barbeque mechanism assembly of claim 10, further comprising a latch to hold the bypass mechanism in place.

17. An automatic barbeque mechanism assembly, comprising a cooking oven, a conveyor mechanism mounted in the oven, a sauce tank mounted in the oven for holding sauce, a food carrying mechanism connected to the conveyor means for carrying food products to be cooked within in the oven and into the sauce tank so as to dip the food products into the sauce, and a bypass mechanism for preventing the food carrying mechanism from dipping into the sauce wherein the bypass mechanism can be activated from the exterior of the cooking oven with one hand.

18. The automatic barbeque assembly of claim 17, wherein the bypass mechanism includes a bypass lever, permanently affixed to a bypass lever rod, the bypass lever rod being rotatably mounted within the oven.

19. An automatic barbeque mechanism assembly of claim 17, wherein a portion of the bypass lever rod extends through an opening in the oven and rotates therein.

20. An automatic barbeque mechanism assembly of claim 17, wherein the bypass mechanism includes an activation rod mounted to the bypass lever rod on the exterior of the oven.

21. A barbeque assembly of claim 17, wherein the activation rod includes a handle for activating the bypass mechanism.

22. An automatic barbeque assembly of claim 17, further comprising a latch to hold the bypass mechanism in place.

* * * * *